Figure 1:
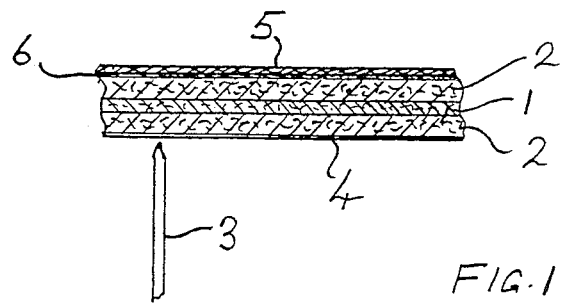

United States Patent [19]

Vane

[11] Patent Number: 4,808,465

[45] Date of Patent: Feb. 28, 1989

[54] COMPOSITE MATERIAL

[76] Inventor: Jeffrey A. Vane, 12 Cleveland Grove, Northcroft Park, Newbury, Berkshire RG13 1XF, England

[21] Appl. No.: 122,377

[22] Filed: Nov. 19, 1987

[30] Foreign Application Priority Data

Nov. 20, 1986 [GB] United Kingdom ............... 8627786

[51] Int. Cl.[4] .................. B32B 15/08; B32B 15/14
[52] U.S. Cl. .................... 428/233; 181/288; 181/290; 181/294; 428/234; 428/235; 428/251; 428/252; 428/253; 428/285; 428/300; 428/301; 428/318.4; 428/319.1; 428/408; 428/432; 428/450; 428/457; 428/458; 428/542.8; 428/921
[58] Field of Search ............... 428/233, 234, 251, 252, 428/253, 285, 300, 432, 450, 457, 458, 921, 301, 318.4, 319.1, 408, 542.8

[56] References Cited

U.S. PATENT DOCUMENTS

| | | | |
|---|---|---|---|
| 4,077,491 | 3/1978 | Hankel | 181/33 G |
| 4,366,917 | 1/1983 | Kotcharian | 220/442 |
| 4,378,403 | 3/1983 | Kotcharian | 428/433 |
| 4,401,707 | 8/1983 | Bailey et al. | 428/285 |
| 4,446,191 | 5/1984 | Miyadera et al. | 428/285 |
| 4,485,138 | 11/1984 | Yamamoto et al. | 428/285 |
| 4,522,673 | 6/1985 | Fell et al. | 428/233 |
| 4,522,875 | 6/1985 | Still, Jr. et al. | 428/285 |
| 4,535,017 | 8/1985 | Kuckein et al. | 428/285 |

*Primary Examiner*—James C. Cannon
*Attorney, Agent, or Firm*—Finnegan, Henderson, Farabow, Garrett & Dunner

[57] ABSTRACT

The invention provides a self-supporting frame resistant composite material comprising at least one layer of lead material and at least one layer of flame resistant fibrous material, the layers having been bonded together, e.g., mechanically as by needling, to provide a self-supporting structure.

13 Claims, 1 Drawing Sheet

COMPOSITE MATERIAL

This invention relates to composite materials.

In general and in structural engineering there exists a need for thermal and/or acoustic barriers; and in many such applications it is required that the barrier be non-flammable or flame retardant. Such barriers may also need to be flexible, for example in the form of a curtain which may be hung or draped to acoustically and/or thermally shield a given area or piece of equipment.

Whereas lead has been found to be a very effective acoustic barrier, in a sheet form it is very often too heavy, not sufficiently flexible, and/or too expensive for many applications.

A form in which lead has been found to retain its acoustic insulating properties, and yet remain sufficiently cheap for large-scale applications, is in the form of a layer or mat of non-woven strands or threads of lead. However, in this form such a layer of lead is fragile and is not sufficiently self-supporting to be hung as a curtain and in fact tends to disintegrate when subject to even a relatively small amount of handling.

A known method of making the layer of non-woven lead self-supporting is to embed same in a sheet of PVC plastics material whereby to form a flexible sheet material. However, the resulting sheet material is not flame resistant and, nor is it sufficiently thermal insulating to create an effective thermal barrier.

According to one aspect of the present invention there is provided a composite material comprising at least one layer of lead material and at least one layer of fibrous material, the layers having been bonded together to provide a self-supporting structure.

The term "lead material" as used herein and in the claims hereof means a layer or mat of non-woven or woven strands or threads of lead, lead wool, lead foil or expanded lead mesh.

The at least one layer of fibrous material is preferably a layer or mat of non-woven glass fibres to provide good thermal insulation together with good fire resistant or fire retardant properties. However any suitable organic or inorganic fibrous material, either knitted, woven or non-woven, can be used if desired dependant upon the properties required of the composite material. Examples of such fibrous materials are, in addition to glass fibres, carbon fibres, aramid fibres, ceramic fibres, mineral wool and polyester fibres incorporating flame retarding agents, or mixtures or different layers thereof.

The or each layer of lead material may be sandwiched between layers of fibrous material.

The layers are preferably mechanically bonded together as by needling although they can be bonded together in any other suitable manner such as adhesively e.g., using a suitable epoxy adhesive, or by stitching, knitting through or the like.

According to a second aspect of the present invention there is provided a reinforced plastics article comprising a composite material according to the first aspect of the present invention impregnated with a synthetic resinous material.

The article of the invention may be a moulded article and may be of any desired shape and/or design. The article is suitable for use in many different applications according to the fibrous material used in the composite material. For example, where the fibrous material is glass fibres and the synthetic resinous material is a polyester resin the article may be an acoustic housing or cover for internal combustion engines, machinery or the like.

According to a third aspect of the present invention there is provided a composite material according to the first aspect of the invention or an article according to the second aspect of the present invention having a coating or finish on at least one surface thereof.

The coating or finish may be a metal coating and may be applied in any suitable or known manner, for example by any of the known metallising techniques such as spraying or plasma coating. The metal coating is preferably an aluminium coating although other metals may be suitable. Such a metal coating may be used to improve heat insulation by reflection of radiant heat, and/or to improve fire resistance and/or to improve appearance and/or to bind the fibres at the surface of the composite material and so make the material easier and safer to handle. Alternatively the coating or finish may be a layer or coating of plastics, textile, metal foil or other material which is preferably fire resistant or fire retardant. A particularly suitable spray-on coating is a spray-on silicone foam such as that sold under the trade mark "POLYVOLTAC".

Figure 2:
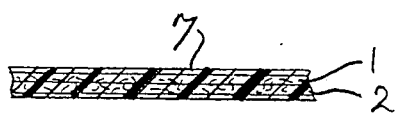

The invention will be more particularly described with reference to the accompanying drawings, in which:

FIG. 1 is a sectional elevation on an enlarged scale of a composite material according to the present invention, and FIG. 2 is a sectional elevation on an enlarged scale of a reinforced plastics article, in this case a reinforced plastics sheet, according to the invention.

Referring to FIG. 1 it will be seen that the composite material comprises a layer 1 in the form of a mat of non-woven strands or threads of lead sandwiched between two layers 2 each in the form of a mat of non-woven glass fibres, the layers 1 and 2 having been mechanically bonded together by needling. Needling is a known process and simply comprises forcing a plurality of needles 3 (only one of which is shown) through the superimposed layers 1 and 2 so that fibres from one layer are caused to extend into the adjacent layer and so secure the layers together. Needling is continued until the composite material is self-supporting. The resulting self-supporting composite material is suitalle for use without further processing in situations where cosmetic appearance is not a criteria, e.g., as an acoustic and/or thermal insulation in buildings.

If desired the composite material formed as aforesaid may be provided with a coating or finish on one or both surfaces thereof. Thus, as illustrated in FIG. 1, a coating 4 may be applied to one or both surfaces of the composite material. The coating 4 may be of metal, plastics (either foamed or not) or other suitable coating material or composition and may be applied in any suitable manner, as by spraying, plasma coating or the like.

Alternatively, or in addition, the composite material may have a finishing surface layer 5 applied to one or both surfaces thereof as by means of an adhesive layer 6. The surface layer 5 may be a textile, plastics or other sheet material or a metal foil.

The plastics article illustrated in FIG. 2, in which like reference numerals are used for like parts, comprises a composite material formed as described in connection with FIG. 1 but having only one layer 2 of non-woven glass fibres on one side of the layer 1 of non-woven threads or strands of lead. The superimposed layers 1 and 2 are only lightly needled sufficient to provide a self-supporting structure. The resulting composite material is then impregnated with a synthetic resinous material 7, such as a suitable polyester resin, so that the composite material becomes embedded therein. The impregnating of the composite material may be effected in a suitable mould or the impregnated composite material may be cured in a mould to produce plastics articles of required shapes, such as acoustic housings for motors, engines or machinery. When the layers are bonded together by needling they may be needled to various densities depending upon the use to which the composite material is to be put. For example, where the composite material is to be used without addition to provide sound and/or heat and/or fire insulation in buildings, the fibrous material may comprise glass or other non-flammable or fire resistant fibres to comply with fire regulations, the layers being densely needled through in order to provide sufficient support to the layer of lead material, and hence sufficient strength to the composite material to allow same to support its own weight, for example when hung as a curtain. Such a densely needled material may be used between walls or partitions, e.g., to provide heat and acoustic insulation, where no cosmetic covering to the composite material need be provided and where no means to prevent egress of glass or other fibres is required.

For use as a sound insulating curtain the composite material of the present invention may have one or both surfaces thereof coated e.g., metallised, as aforesaid or otherwise treated to bind the fibres at the said surface or surfaces and/or to improve the appearance thereof. In this way an effective sound insulating curtain may be provided which is flexible and may be drawn across a room to a desired width to provide sound insulation e.g., in public areas of buildings such as hotels, night clubs, and other places of entertainment.

Where the composite material of the present invention is used to produce an article according to the second aspect thereof, less dense needling will generally be desirable to allow the material to "wet-out" i.e., to allow the material to be properly impregnated with the synthetic resinous material.

The composite material of the present invention may comprise a single layer of lead material and a single layer of fibrous material bonded together. Preferably, however, the or each layer of lead material is sandwiched between layers of fibrous material and the layers bonded e.g., needled, together.

The composite material of the present invention, when in a non-flammable or fire resistant form, is capable of complying with British Standard 476, Class 0 and Class 1 fire regulations and hence is suitable for sound and heat insulation purposes in civil engineering applications. A composite material according to the present invention comprising a mat of non-woven lead strands and a scrim of non-woven glass fibres needled together and impregnated with a polyester resin has been produced which conforms to British Navy Standards NES711 and NES713, issues 2 and 3, as regards smoke emission and toxicity.

I claim:

1. A self-supporting flame resistant composite material comprising at least one layer of lead material and at least one layer of flame resistant fibrous material, the layers having been bonded together to provide a self-supporting structure said lead material comprising a layer or mat of non-woven lead strands and said flame resistant fibrous material comprising a layer or mat of non-woven glass fibers.

2. A composite material according to claim 1, wherein said layer of lead material is sandwiched between layers of fibrous material.

3. A composite material according to claim 1, wherein said layers are adhesively bonded together.

4. A composite material according to claim 1, wherein said layers are mechanically bonded together.

5. A composite material according to claim 4, wherein said layers are mechanically bonded together by needling.

6. A composite material according to claim 1, when provided with a coating or finish on at least one surface thereof.

7. A composite material according to claim 6, wherein said coating or finish is a metal coating.

8. A composite material according to claim 6, wherein said coating or finish is selected from the group comprising a layer or coating of plastics, textile or metal foil.

9. A composite material according to claim 6, wherein said layer or coating is a spray-on silicone foam.

10. A reinforced plastics article comprising a composite material consisting of at least one layer of lead material and at least one layer of flame resistant fibrous material, the layers having been bonded together to provide a self-supporting structure, said composite material having been impregnated with a synthetic resinous material.

11. A plastics article according to claim 10, when moulded.

12. A reinforced plastics article according to claim 10, wherein said composite material comprises at least one layer or mat of non-woven lead strands and at least one layer or mat of non-woven glass fibres, said layers having been mechanically bonded together by needling.

13. A plastics article according to claim 10, wherein the synthetic resinous material is a polyester resin.

* * * * *